United States Patent Office 3,721,549
Patented Mar. 20, 1973

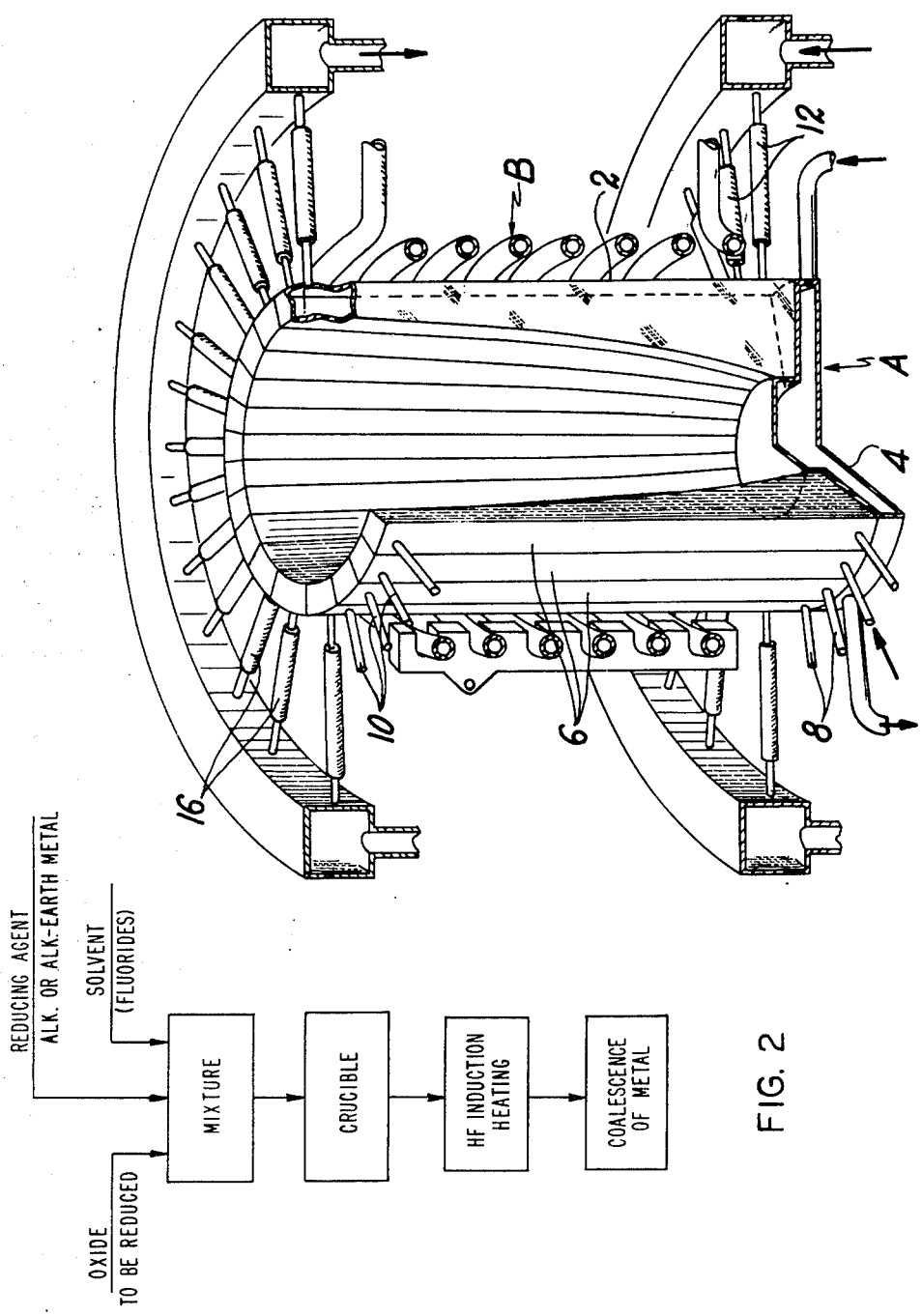

3,721,549
PREPARATION OF METAL INGOTS FROM THE CORRESPONDING METAL OXIDES
Jean-Jacques Gallay, deceased, late of Talant, France, by Marielle Gallay, administratrix, Talant, Jean-Louis Helary, Nantes, and Marcel Jurien-de-la-Graviere, Fontaine-les-Dijon, France; said Helary and said Jurien-de-la-Graviere assignors to Commissariat a l'Energie Atomique, Paris, France
Filed July 7, 1970, Ser. No. 52,829
Claims priority, application France, July 11, 1969, 6923886
Int. Cl. C22b 53/00
U.S. Cl. 75—84.1
13 Claims

ABSTRACT OF THE DISCLOSURE

Metals such as U, Pu, Ti, Zr in the massive state are prepared from their oxides by heating a mixture in a non-oxidizing atmosphere by direct induction of HF electric currents, said mixture comprising the oxide, an alkali-earth reducing metal (Ca or Mg) and the fluoride of the reducing metal, either alone or mixed with calcium fluoride. Induction heating is maintained beyond start-up of the reaction metal until coalescence of the metal.

---

This invention relates to a method of preparation of metals in the form of massive ingots by direct reduction of one of their oxides without passing through an intermediate compound and is also concerned with a device for carrying out the method. This method can be applied in particular to the actinides with the exception of actinium, to the lanthanides and to some costly metals such as titanium. The method is particularly well suited to the case of enriched uranium in which the quantities of metal employed in each operation always remain relatively small.

Up to the present time, attempts to produce a number of metals in the form of massive ingots by direct reduction of one of their oxides have met with failure. In point of fact, even when a highly reducing metal such as calcium or magnesium is employed, direct reduction even with preheating and notwithstanding the exothermic nature of the reaction results in a metal in powdered form which is often pyrophoric and which cannot readily be recovered since it is enclosed in a matrix of refractory oxide (CaO or MgO). In the case of titanium, the high solubility of oxygen leads to a further disadvantage in that reduction by magnesium results at 1000° C. in the production of titanium which contains 25,000 p.p.m. of oxygen. TiO is obtained at 900° C. and $Ti_3O_4$ is obtained at 750° C., the reduction being incomplete. When using calcium, the reaction starts at 500° C. and proceeds to completion at about 1000° C., the titanium obtained having an oxygen content of 1000 p.p.m.

Up to the present time, it has therefore been found necessary to provide an intermediate stage for converting the oxide of the metal to an intermediate compound (usually a halide) which is then subjected to the reduction operation.

Two examples can be given:
(1) It has not proved possible heretofore to prepare uranium or plutonium metal ingots by direct reduction of oxide ($UO_2$ or $U_3O_8$ in the case of uranium): the usual method consists in converting the dioxide to tetrafluoride at about 500° C. in accordance with the reaction:

$$UO_2 + 4HF \rightarrow UF_4 + 2H_2O$$

then in reducing the tetrafluoride with calcium or magnesium, the reaction being in the case of calcium:

$$UF_4 + 2Ca \rightarrow 2CaF_2 + U$$

The exothermic nature of the reaction involving reduction of the tetrafluoride is sufficient to ensure that the slag $CaF_2$ is converted to the liquid state and that the metal collects in a compact form.

Whereas the reduction of tetrafluoride does not present any special problem, halogenation of the oxide constitutes an additional step and this is attended by the many disadvantages which are also found in the halogenation of the other elements. In particular, the need for this operation increases the cost price of the metal. The reaction as carried out on an industrial scale is a difficult and slow process since this is a reaction of the gas-solid type. The reaction is often incomplete and is liable to yield very stable oxyhalogenated products which impair the efficiency of the subsequent reduction and the quality of the metal. Finally, the halogenation reaction is carried out at high temperature and entails the use of highly corrosive gases (HF or wet HCl) which call for costly equipment and maintenance as well as frequent supervision. In the case of treatment of some metals, the operation constitutes a substantial source of chemical contamination. Finally, the nature of the reagents makes any leakage which may occur a considerable potential hazard.

To these general drawbacks, there can be added others which are specific to the metal being treated; in the case of plutonium, for example, the tetrafluoride $PuF_4$ emits fast neutrons which entail the need for substantial biological shielding.

(2) Similarly, it has not been possible up to the present time to prepare titanium ingots by direct reduction of $TiO_2$, especially by reason of the solubility of oxygen in titanium. The usual method consists first in converting $TiO_2$ to the tetrachloride $TiCl_4$ according to the reaction:

$$TiO_2 + 2Cl_2 + 2C \rightarrow TiCl_4 + 2CO$$

The reaction takes place between 800° and 1000° C. and is endothermic ($\Delta F = 10.9$ kcal.). The tetrachloride is then reduced by calcium, magnesium or sodium. Thus: either $$TiCl_4 + 2Ca \rightarrow 2CaCl_2 + Ti$$

or $$TiCl_4 + 2Mg \rightarrow 2MgCl_2 + Ti$$

The exothermic nature of the reaction involving reduction of the tetrachloride is sufficient to ensure that the slag passes to the liquid state but the metal does not consolidate to form an ingot, there being thus obtained a light and porous mass ("titanium sponge") which contains between 15 and 20% of slag. The size of the particles varies between 1 mm. and a few tens of millimeters, depending on the masses which are present and on the nature of the reducing agent. The two operations (chlorination and reduction of the tetrachloride) can be carried out on an industrial scale only with difficulty and result in a high cost price.

The present invention is intended to provide a method and device for direct preparation of metals from their oxides which makes it possible to obtain said metals, not in the powdered form but in the consolidated form.

With this objective, the invention proposes a method of preparation of metals in the massive state from the oxides of said metals, wherein a mixture is heated in a non-oxidizing atmosphere by direct induction of electric currents at least until start-up of the reduction reaction and wherein said mixture comprises the oxide to be reduced, an alkali or alkaline-earth reducing metal and a common solvent for the reducing metal and for the oxide formed by the reaction, said solvent being constituted by the fluoride of the reducing metal either alone or mixed with another alkali or alkaline-earth fluoride which is miscible therewith and not reducible by said reducing metal.

It is readily apparent that the reducing metal employed must in addition be more highly reducing than the metal to be prepared: calcium satisfies this condition in the case of all metals except actinium. Magnesium also fulfils this condition but in the case of a more limited number of metals. Titanium oxide TiO is no longer reduced by Mg above 1870° and zirconium oxide $ZrO_2$ is no longer reduced above 1650°.

The solubility of the oxide formed in the slag can in some cases be increased by addition of a second fluoride to the fluoride of a reducing metal, provided of course that said second fluoride is not reduced and is soluble in the first fluoride. Moreover, it is preferable to ensure that the metal to be prepared and the reducing metal do not have relative solubility. Among other reducing metals, calcium and magnesium can profitably be employed, the maximum temperature being lower in the case of magnesium. Thus, the association of calcium (or magnesium) with calcium fluoride (or magnesium fluoride associated with calcium fluoride) makes it possible to achieve the above-defined result by virtue of the interaction of the properties of these two substances. Calcium fluoride is a powerful solvent for the oxide CaO which is formed during the reaction. The solubility by weight of CaO in $CaF_2$ is in the vicinity of 50% at 1500° C. and 60% at 1700° C. Furthermore, calcium fluoride has a sufficiently low vapor pressure to permit of its use in the preparation of metals which have a high melting temperature; its vapor pressure is 0.2 mm. of mercury at 1500° C., 0.75 mm. at 1600° C. and 2.3 mm. at 1700° C. The fluoride is evidently not reduced by the calcium which is employed as agent for reducing the oxide to be treated and is a solvent for the majority of oxides to be reduced ($UO_2$, for example). Similarly, if the reduction is carried out by magnesium, the oxide MgO which is formed is soluble at 1240° C. up to 10 mole percent in $MgF_2$ and up to 50 mole percent in $CaF_2$. Calcium fluoride is not reduced by Mg.

Calcium ranks foremost among the metals which have a high affinity for oxygen and permits reduction of practically all of the metal oxides. It has mutual liquid-liquid solubility with calcium fluoride $CaF_2$ which is complete above the melting temperature of $CaF_2$ (1418° C.). Since calcium is soluble in $CaF_2$, any separation between two liquid phases as a result of difference in density is avoided as this would lead to a reaction which takes place only at the interface and to rapid removal of the calcium metal by volatilization. Since the calcium is dissolved in the fluoride, its vapor pressure is thereby considerably reduced so that it is possible to carry out prolonged operations at high temperature and at atmospheric pressure.

In the majority of cases, calcium is insoluble in the metal to be prepared so that it is not necessary to carry out a subsequent separation in the ingot which is obtained. For example, the solubility of Ca in Ti at 1200° C. is 0.07% by weight; the solubility of Mg in Ti is 0.6% but the magnesium is automatically eliminated at the time of remelting in vacuum as is in any case necessary.

The reduction of an oxide $MO_2$ is carried out with calcium in accordance with the reaction diagram:

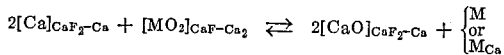

In the above formula, the chemical symbols between square brackets indicate substances in solution in the substance which is placed as a sub-index behind the brackets. The reaction is similar in the case of magnesium when use is made of a flux consisting of $MgF_2$ or a mixture $MgF_2$-$CaF_2$.

In short, the use of calcium in a calcium fluoride flux offers in particular the following advantages: the reducing metal does not separate as a result of difference in density of the reaction medium; it is not necessary to carry out the reaction in a closed reaction vessel or bomb in spite of the use of high temperatures since the vapor pressure remains low by reason of the low volatility of calcium and magnesium fluorides and the reduced volatility of calcium (and magnesium) in solution; the reduction takes place in the midst of the reaction mass and not along one interface, thereby resulting in highly improved reduction kinetics.

The use of calcium fluoride has yet another advantage in regard to the preheating of the reaction mass until start-up of the reduction reaction. Even in the cold state, calcium fluoride exhibits high ionic conductivity. The electrical conductivity of the mixture Ca-$CaF_2$ (or Mg-$MgF_2$-$CaF_2$) is still distinctly higher by reason of the appearance of additional electron conductivity. It is therefore possible to produce high-frequency currents by induction within the reaction mass even from room temperature and in respect of mixtures having a low calcium content. This property makes it possible to heat the charge from room temperature by induction of electric currents at a suitable frequency within the reaction mass itself and not by heating of a conductive vessel which contains said mass. In consequence, the reaction can be carried out in a device as described in United States patent application Ser. No. 16,520 filed on Mar. 4, 1970, by Jean-Louis Helary et al.

In the accompanying drawings, FIG. 1 shows a furnace disclosed and claimed in U.S. application Ser. No. 16,520; and FIG. 2 is a flow diagram of the method of the present invention.

The method according to the invention can be carried into effect as follows as seen in FIG. 2: there is first formed a reaction charge consisting of a mixture which contains the oxide powder to be reduced, the reducing metal and the fluoride of the reducing metal. If this metal is calcium, it may be present in the form of grains which are distributed within the charge. A premelted and ground mixture of calcium and calcium fluoride can also be added to the powdered oxide. Be that as it may, the respective portions of the different constituents must be such that the reducing agent is in excess with respect to the quantity which is stoichiometrically necessary in order to reduce the oxide and that the flux is not saturated with oxide on completion of the reaction and at the temperature at which this latter is conducted. For example, when the reducing agent is calcium and the charge is heated from room temperature to the point of start-up of the reaction by direct induction of electric currents having a frequency of a few hundred kc./s., it is necessary to employ a percentage of approximately 10% by weight of calcium in the fluoride. This value can be lower in the case of a generator which produces a high frequency of the order of 1 to 10 mc./s.

The reaction charge as thus constituted is placed in a furnace which is intended to bring the reaction mass to the starting temperature and then to maintain said mass at a temperature which is higher than the melting point of the metal to be prepared and also higher than the melting point of the calcium fluoride over a period which can last from 15 to 30 minutes. Said furnace must in turn be placed in a non-oxidizing atmosphere and there will accordingly be employed for this purpose an argon or nitrogen atmosphere which is chosen according to the nature of the metal to be prepared.

Once the reaction has started at a temperature which depends on the oxide being treated, the heat which is necessary to ensure coalescence of the metal is supplied continuously by means of the furnace. It is usually an advantage to agitate the flux by means of vibrations, for example, for a period of a few minutes prior to completion of the operation in order to assist the coalescence of the metal which is formed.

During the melting process, the oxide to be reduced is dissolved either wholly or partly in the flux and is subjected therein to the reducing action of the reducing agent: the metal which appears within the flux in the form of small molten droplets begins to coalesce progressively as the oxide formed is dissolved. Said droplets settle in the bottom of the vessel and thus form an ingot.

The furnace which is employed for the practical application of the method must combine a certain number of properties and in particular the following:

The furnace vessel must be chemically inert with respect to the constituents of the reaction mass at the contacting temperature. Most ceramic components are attacked by calcium fluoride in the liquid state. As to vessels in the form of metallic crucibles, these are not wholly satisfactory since they contaminate the metal and they must frequently be replaced, thereby imposing a heavy cost penalty.

The furnace must make it possible to bring the constituents of the reaction mass to the molten state and to maintain them in this state in order that the oxide should dissolve completely in the flux, thus entailing efficient heating which can be maintained for an appreciable period of time.

There will now be described by way of example a furnace which conforms to the above-mentioned conditions as well as the preparation of a number of metals by means of the method according to the invention and with the aid of said furnace. Reference is made in the description to the single accompanying figure in which the essential parts of the furnace are shown in perspective.

The furnace which is illustrated in FIG. 1 is of the type described and claimed in United States patent application Ser. No. 16,520, which was cited earlier and to which reference may usefully be made. Said furnace is made up of a vessel A and an inductor B which is supplied by a high-frequency current generator (not shown). The vessel A comprises a side wall 2 constituted by a large number of identical metal segments 6 which are insulated from each other and by a base 4. Each segment 6 is cooled by means of a cooling liquid which is admitted at 8 and discharged at 10. The furnace can be placed within an enclosure which contains any desired atmosphere (glove box, for example, in the case of reduction of plutonium). The reaction mass is heated from room temperature by induction of electric currents in said mass.

The preparation conditions evidently change according to the oxides to be reduced and the reducing metal which is employed. A number of examples of preparation will now be given although it will be understood that these examples are not intended to imply any limitation whatsoever.

(1) Preparation of uranium ingots from $UO_2$ or $U_3O_8$

The reducing metal employed can advantageously be calcium since this latter makes it possible to obtain highly compact ingots without any subsequent need for remelting. The starting oxide can be $U_3O_8$ which can be more readily obtained than $UO_2$. However, the quantity of calcium which is necessary is reduced by approximately one-third if the starting oxide is $UO_2$ as obtained by preliminary reduction of $U_3O_8$ by hydrogen. The flux is $CaF_2$.

The operation takes place in accordance with the procedure which has already been mentioned: the current supply frequency can be approximately 400 kc./s. if the percentage of Ca in $CaF_2$ is 10% by weight.

Once the reaction has started by coupling of the inductor either with calcium when this latter is present in granular form or with the premelted and ground conductive mixture $Ca$–$CaF_2$, the reaction then proceeds. The molten reaction mass remains separated from the vessel wall by a layer of its own slag in which the temperature has a high gradient, with the result that a solid film of slag remains in contact with the cold wall of the vessel A, thereby preventing contamination.

The quantity of heat which is necessary in order to maintain the reaction mass in the molten state during the time which is necessary to ensure coalescence once the reaction proper has proceeded to completion is supplied by direct induction which can be all the more readily ensured by virtue of the fact that the molten mixture is highly conductive.

Two typical examples of preparation of uranium by starting with $UO_2$ in one case and with $U_3O_8$ in the other case are set forth in detail in the following table. The results obtained are reproducible so that it would appear unnecessary to provide further examples of preparation under similar conditions.

| Examples | I | | II | |
|---|---|---|---|---|
| Composition of the charge: | | | | |
| Oxide | $UO_2$ | 200 | $U_3O_8$ | 156 |
| Ca | | 135 | | 140 |
| $CaF_2$ | | 465 | | 600 |
| Percentage of CaO in $CaF_2$+CaO | 15.14 | | 12.2 | |
| Percentage of Ca in $CaF_2$+Ca | 14 | | 11.9 | |
| Operating conditions: | | | | |
| Temperatures (° C.) | 1,560 | | 1,620 | |
| Total time (min.) | 20 | | 30 | |
| Agitation (min.) | 15 | | 25 | |
| Weight of ingot obtained (g.) | 165.2 | | 125 | |
| Yield, percent | 94.5 | | 96.5 | |

The metal is obtained in the form of a sound, white ingot of bright appearance in which separation from the flux is readily carried out and leaves a clean surface having sharp edges.

Analyses have been carried out in order to determine the impurities which are liable to be introduced by the constituent materials of the enclosure (copper and alumina) and the atmosphere of the glove box (nitrogen and hydrogen) and the residual quantity of oxide. It has thus been observed that, in the case of a starting oxide containing 10 p.p.m. of aluminum, 10 p.p.m. of calcium and 1 p.p.m. of copper by weight, the percentages of impurities contained in the ingots obtained vary within the following limits:

Analysis:  P.p.m. by weight
Cu ———————————————— 1 to 2
Al ———————————————— 20 to 40
Ca ———————————————— 10 to 20
H ————————————————— 0 to 20
N ————————————————— 20 to 80

It is observed that the percentage of measured impurities has not increased to any appreciable extent; the metal obtained has only a relatively low oxygen content.

The method applies similarly to the production of plutonium metal in furnaces of the same type. The quantities employed are in that case evidently limited by the critical mass of the plutonium. However, the quantity to be processed can be increased by employing boron water for the purpose of cooling the vessel, thereby permitting unit operations on masses of plutonium which vary in weight between 4 and 5 kg.

It must also be noted that the method according to the invention permits not only direct preparation of the metal from its oxide but also makes it possible to obtain from a mass of partially oxidized metal an ingot which has a very low oxygen content. In this respect, the method according to the invention is wholly suited for the deoxidation of wastes such as shavings.

(2) Preparation of titanium from $TiO_2$

In this instance also, it is clearly possible to make use of calcium as reducing agent, the slag being constituted by $CaF_2$. However, it will prove advantageous to employ magnesium as this latter is much more economical.

The flux will in that case contain magnesium fluoride either alone or preferably mixed with calcium fluoride. In fact, the addition of $CaF_2$ reduces the melting temperature of the flux (950° C. in the case of the eutectic mixture $CaF_2$-$MgF_2$) and increases the solubility of MgO in the slag.

At 1240° C., the oxide MgO is soluble up to 10 mole percent in $MgF_2$ and up to 50 mole percent in $CaF_2$. The advantage just mentioned results in a smaller volume of reagent in respect of a given quantity of oxide to be reduced.

Examples corresponding to reduction by calcium and magnesium will now be given.

(a) Reduction by magnesium

| | Example | |
|---|---|---|
| | III | IV |
| | Flux: $MgF_2$ | Flux: $MgF_2$ $CaF_2$ |
| Composition of the charge: | $TiO_2$: | $TiO_2$: |
| Oxide, grams | 300 | 300 |
| Mg, grams | [1] 324 | [1] 324 |
| $MgF_2$, grams | 4,700 | 420 |
| $CaF_2$, grams | | 540 |
| Oxide formed MgO, grams | | 300 |
| Percentage by weight: | | |
| $\frac{MgO}{MgF_2+MgO}$ | 6 | |
| $\frac{MgO}{CaF_2+MgF_2+MgO}$ | | 22.8 |

[1] 8 % excess.

In Example III, a substantial volume of flux of $MgF_2$ was necessary, the solubility of MgO in $MgF_2$ being 10 mole percent at 1230° C. In Example IV in which the percentage of $CaF_2$ contained in the slag is substantially lower than that which corresponds to maximum solubility of $MgO_2$, it is nevertheless apparent that the mass employed is very much smaller than that of Example III.

Even in the case of this maximum solubility which corresponds to 10 moles of $CaF_2$ in respect of 1 mole of $MgF_2$, the melting temperature of the ternary mixture $CaF_2$-$MgF_2$-MgO remains lower than 1200° C.

During the reaction, the titanium appears in the liquid state and collects at the bottom of the vessel in the form of a single ingot. However, by reason of the surface tension between the liquid metal and the slag and by reason of the high melting temperature of titanium, the ingot is of tentacular shape. Only the impurities supplied by the oxide are present in the metal which is completely reduced, there being only a small remaining percentage of oxygen in solution and not in combination. Said oxygen is liberated during re-melting in vacuum which is in any case essential in order to produce ingots having a weight of the order of 1 ton in compliance with industrial requirements.

(b) Reduction by calcium (flux: $CaF_2$)

| Example | V |
|---|---|
| Composition of the charge: | |
| Oxide, grams $TiO_2$ | 300 |
| Ca, grams | [1] 480 |
| $CaF_2$, grams | 1,800 |
| Oxide formed CaO, grams | 420 |
| Percentage by weight: $\frac{CaO}{CaF_2+CaO}$ | [2] 20 |

[1] 60% excess.
[2] Melting point of the mixture = 1,400° C.

It is apparent that, aside from its high cost, calcium which is employed in association with $CaF_2$ has the disadvantage of leading to a much higher melting point of the slag.

(3) Preparation of zirconium from $ZrO_2$

| Example | VI |
|---|---|
| Composition of the change: | |
| $ZrO_2$, grams | 200 |
| Ca, grams | 211 |
| $CaF_2$, grams | [1] 730 |
| Percentage by weight: $\frac{CaO}{CaF_2+CaO}$ | 20 |

[1] 60% excess.

We claim:
1. A pyrometallurgical method for reducing metal oxides directly to metal ingots, including the steps of preparing a mixture which essentially comprises the oxide to be reduced, a reducing agent selected from the group consisting of alkali and alkali earth metals and a common solvent for said reducing metal and for the oxide of the reducing metal, said solvent being selected from the group consisting of the fluoride of the reducing agent and a mixture of said fluoride with a fluoride of another of said agents which is miscible therewith and not reducible by said reducing metal; locating the mixture in a crucible which is transparent to HF magnetic fields; and inducing HF electric currents directly in the mixture in a non-oxidizing atmosphere for heating the mixture at least until start-up of the reduction reaction.

2. A method according to claim 1, wherein the reducing metal is calcium and the solvent is calcium fluoride.

3. A method according to claim 2, wherein the calcium is introduced into the reaction mixture in granular form.

4. A method according to claim 2, wherein the calcium and the calcium fluoride are introduced into the reaction mixture in the form of a premelted, ground or compact homogeneous mixture.

5. A method according to claim 1, wherein direct reduction of HF electric currents in the mixture is continued after the initiation of the reaction until coalescence of the reduced metal has taken place in liquid phase.

6. A method according to claim 5, wherein said common solvent is constituted by a mixture of calcium fluoride and of the fluoride of the reducing metal.

7. A method according to claim 5 for reducing titanium oxide, wherein the reducing agent is magnesium and said common solvent is constituted by a mixture of magnesium fluoride and calcium fluoride.

8. A method according to claim 7, wherein the molar percentage of $CaF_2$ in the solvent is less than ten times the percentage of $MgF_2$.

9. A method according to claim 7, wherein electric currents having a value sufficient to bring the temperature of said mixture to the melting point of titanium are induced in the mixture.

10. A method according to claim 5, wherein the frequency of the electric currents induced in the mass is between 400 kc./s. and 10 mc./s.

11. A method according to claim 1, wherein said mixture is placed in a crucible having a side wall formed of metallic segments which are insulated from each other and wherein liquid coolant is circulated in said segments.

12. A pyrometallurgical method for the preparation of metal titanium in solid form by chemical reduction of titanium oxide, comprising the steps of preparing a mixture of titanium oxide, magnesium in more than stoichiometric proportion and fluorides of magnesium and calcium in an amount sufficient to dissolve said reducing metal and oxide at the temperature of initiation of the reduction; locating said mixture in a crucible having a wall which is transparent to HF magnetic fields under a nonoxidizing atmosphere; and inducing HF electric currents directly into the mixture through the wall until the reduction reaction has started up and until coalescence of liquid titanium in the bottom portion of the crucible.

13. A pyrometallurgical process for reducing uranium and plutonium oxides directly to metal ingots, including the steps of preparing a mixture which essentially comprises the oxide to be reduced, calcium as reducing agent and a common solvent for said calcium and for calcium dioxide, said solvent consisting in part at least of calcium fluoride, locating the mixture in a crucible which is transparent to HF magnetic fields, and inducing HF electric currents directly in the mixture through the crucible for heating the mixture at least until start-up of the reduction reaction while maintaining the mixture out of contact with oxidizing atmosphere and cooling the crucible.

(References on following page)

References Cited

UNITED STATES PATENTS

| | | | |
|---|---|---|---|
| 1,704,257 | 5/1929 | Marden et al. | 75—84 X |
| 1,602,542 | 10/1926 | Marden | 75—84 X |
| 2,849,307 | 8/1958 | Foote | 75—84 |
| 2,904,428 | 9/1959 | Dean | 75—84 |
| 3,493,363 | 2/1970 | Aheurn | 75—84 X |
| 3,219,441 | 11/1961 | Knighton et al. | 75—84.1 |

FOREIGN PATENTS

| | | | |
|---|---|---|---|
| 755,083 | 8/1956 | Great Britain | 75—84 |

OTHER REFERENCES

Kopleman, B.: Fundamental Considerations in the Reduction Processes of Thorium and Uranium, A/Conf. 8/P/531, U.S.A., July 8, 1955, p. 7.

CARL D. QUARFORTH, Primary Examiner

R. E. SCHAFER, Assistant Examiner

U.S. Cl. X.R.

75—84